United States Patent
Klement

(10) Patent No.: US 6,571,172 B1
(45) Date of Patent: May 27, 2003

(54) METHOD FOR DETERMINING THE POSITION OF A VEHICLE IN RELATION TO A CONTAINER CRANE

(75) Inventor: Stefan Klement, Rimpur (DE)

(73) Assignee: Noell Crane Systems GmbH, Würzburg (DE)

(*) Notice: Subject to any disclaimer, the term of this patent is extended or adjusted under 35 U.S.C. 154(b) by 0 days.

(21) Appl. No.: 09/937,833

(22) PCT Filed: Mar. 3, 2000

(86) PCT No.: PCT/DE00/00687

§ 371 (c)(1),
(2), (4) Date: Sep. 28, 2001

(87) PCT Pub. No.: WO00/63755

PCT Pub. Date: Oct. 26, 2000

(30) Foreign Application Priority Data

Apr. 15, 1999 (DE) .......................... 199 16 999

(51) Int. Cl.[7] .................................. G05D 1/02
(52) U.S. Cl. ................. 701/207; 701/50; 701/300; 180/169
(58) Field of Search .................. 701/50, 207, 223, 701/28, 300; 180/169; 342/70

(56) References Cited

U.S. PATENT DOCUMENTS 5,067,013 A * 11/1991 Lindholm et al. ......... 294/66.2
5,142,658 A * 8/1992 McMorran et al. ......... 180/167
5,919,022 A * 7/1999 La Coste .................... 212/326

FOREIGN PATENT DOCUMENTS

| DE | 36 06 363 | 9/1987 |
|---|---|---|
| DE | 196 26 044 | 1/1998 |
| FR | 2 703 347 | 10/1994 |
| GB | 2 270 438 | 3/1994 |

* cited by examiner

Primary Examiner—Michael J. Zanelli
(74) Attorney, Agent, or Firm—Collard & Roe, P.C.

(57) ABSTRACT

A method for determining the position of a vehicle, preferably of a portal stacking truck in relation to a container crane, in which a sensor serves for determining the position of the stacking truck, and evaluating devices are coupled to a detection device, and in which the posts of a container crane are detected as positioning aids in terms of angle and distance by means of a scanner mounted on the stacking truck and transmitted to an evaluating computer, which compares the signals with signals provided in its program and determines the exact position of the stacking truck in relation to the posts of the container, and drives the stacking truck from this position into an exactly predetermined position in relation to the posts of the container.

2 Claims, 3 Drawing Sheets

METHOD FOR DETERMINING THE POSITION OF A VEHICLE IN RELATION TO A CONTAINER CRANE

CROSS REFERENCE TO RELATED APPLICATIONS

Applicant claims priority under 35 U.S.C. §119 of German Application No. 199 16 999.3 filed Apr. 15, 1999. Applicant also claims priority under 35 U.S.C. §120 of PCT/DE00/00687 filed Mar. 3, 2000. The international application under PCT article 21 (2) was not published in English.

BACKGROUND OF THE INVENTION

1. Field of the Invention

The present invention relates to a method for determining the position of a vehicle.

The invention is applicable where ever vehicles, preferably portal stacking trucks have to be moved into an exact position in relation to a container crane, so that no repositioning of the container crane is required.

2. The Prior Art

Container cranes are special portal container cranes for unloading ships, and also stacking cranes in a container depot. The transshipment of containers has been carried out until now with container cranes or portal stacking trucks only by manual operations. When the load is transferred to the container crane, the driver of the transport vehicle has to deposit the container approximately in the center below the container crane. For picking up the load with the container crane, the latter is repositioned, as a rule. Now, for fully automatic container cranes, the problem on hand is to always position the transport vehicle exactly in the center position below the container crane for transferring the load, so that no repositioning is required for picking up the load with the container crane. This requires that the transport vehicle is oriented in relation to the container crane with such precision that the container can be accurately set down.

A device for determining the position of a vehicle in relation to a container hoisting device is known from DE 36 06 363, in connection with which at least two sensors operating based on ultrasound assume with parallel axes an unchanged position in relation to a framework structure of the hoisting device; the transport vehicle is equipped with reflectors; evaluation devises are coupled to a detection device; and holding marks are required so that the positioning process can be carried out.

It is a drawback in connection with such a method, among other things, that means such a holding marks, reflectors and similar pieces of equipment have to be mounted in order to detect the position of the transport vehicle or of the container.

SUMMARY OF THE INVENTION

Therefore, an object of the invention is to develop a method by means of which a transport vehicle, preferably a portal vehicle orients itself vis-à-vis a container crane without markings having to be attached to said crane, so that an automatic operation of the vehicle is assured in which the position of the vehicle in relation to the container crane is always exactly known.

This object is achieved according to the present invention.

The method as defined by the invention for the determination of the position of a vehicle in relation to a container crane is based on the fact that container cranes have a prominent contour up to a certain height. The vehicle, for example a portal stacking truck can orient itself on such a prominent contour. It is necessary for such orientation that, for example the portal stacking truck has a scanning device. Said scanner, for example a laser scanner, can be arranged on the top edge of the portal stacking truck in the driving direction. The laser scanner detects the posts of the portal crane as positioning aids. This can be accomplished in that the scanner detects the angle and the distance of the posts of the portal crane and transmits this information to an evaluating computer. The software of the evaluating computer contains data with respect to the contour of the posts of the container crane and in this way determines the exact position of the transport vehicle in relation to the posts of the container crane.

After the actual position of the portal stacking truck has been determined by means of the evaluating computer, a comparison is carried out with the nominal position into which a container has to be moved. By means of the drive and the drive control and continual comparison between the actual and the nominal data via a position controller, the vehicle with the container is maneuvered into the desired position until the data of the nominal and the actual positions correspond. An orientation takes place in this connection continually via the data of the posts of the container crane detected by the scanner.

It is advantageous for the method if a plurality of laser scanners is arranged on the vehicle. Such laser scanners may be arranged vertically or horizontally. Of decisive importance is that the positions of the laser scanners vis-à-vis the vehicle are balanced. However, it is advantageous if the laser scanner is mounted on the stacking truck horizontally at a level that permits clear orientation on the posts of the container crane.

BRIEF DESCRIPTION OF THE DRAWINGS

The invention is explained in greater detail in the following with the help of an exemplified embodiment and 3 figures, in which.

A DETAILED DESCRIPTION OF PREFERRED EMBODIMENTS

Figure 1:
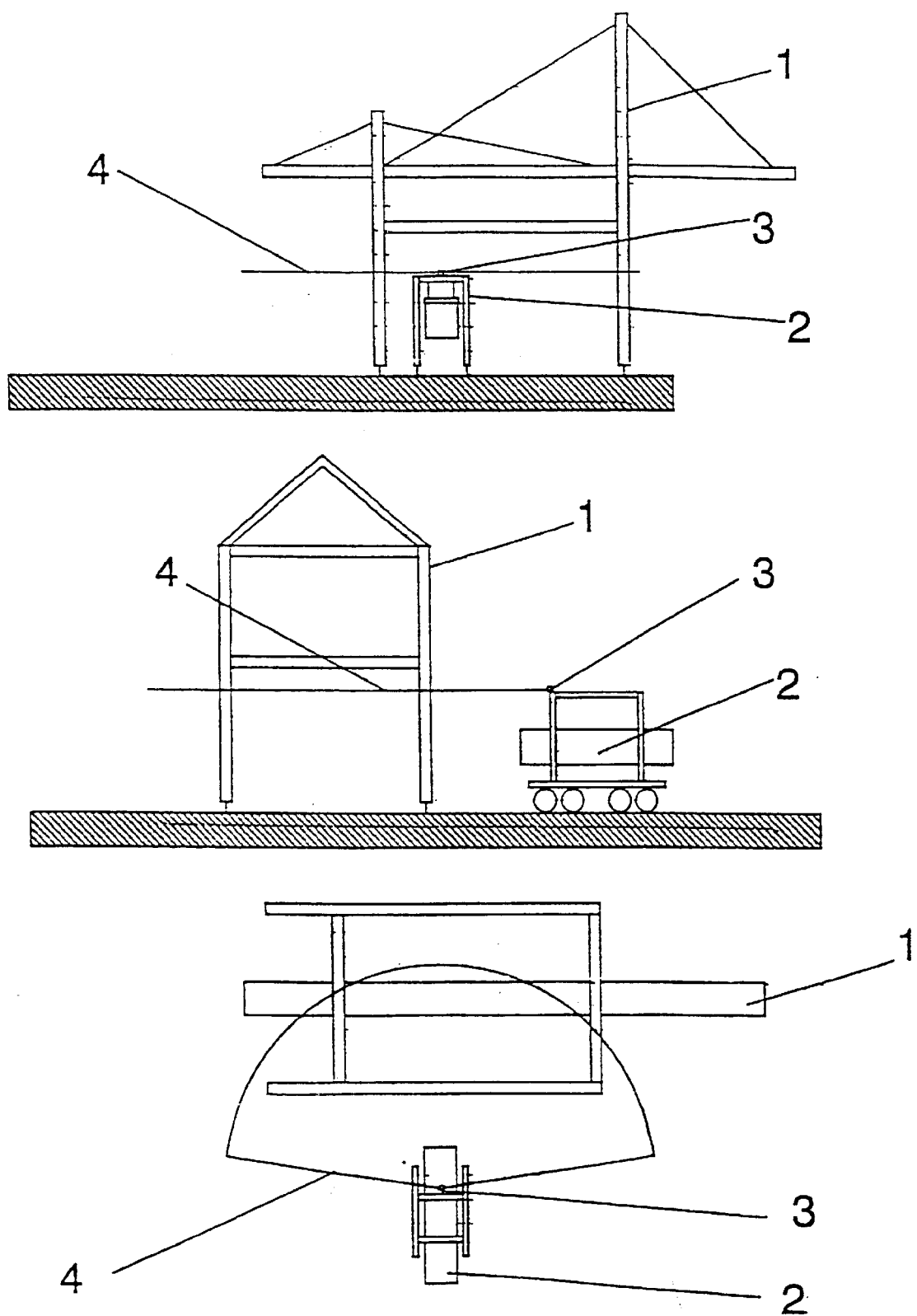
FIG. 1 is a schematic representation of three views of a container portal and a portal stacking vehicle with a laser scanner as it is being driven to a portal container crane.
Figure 2:
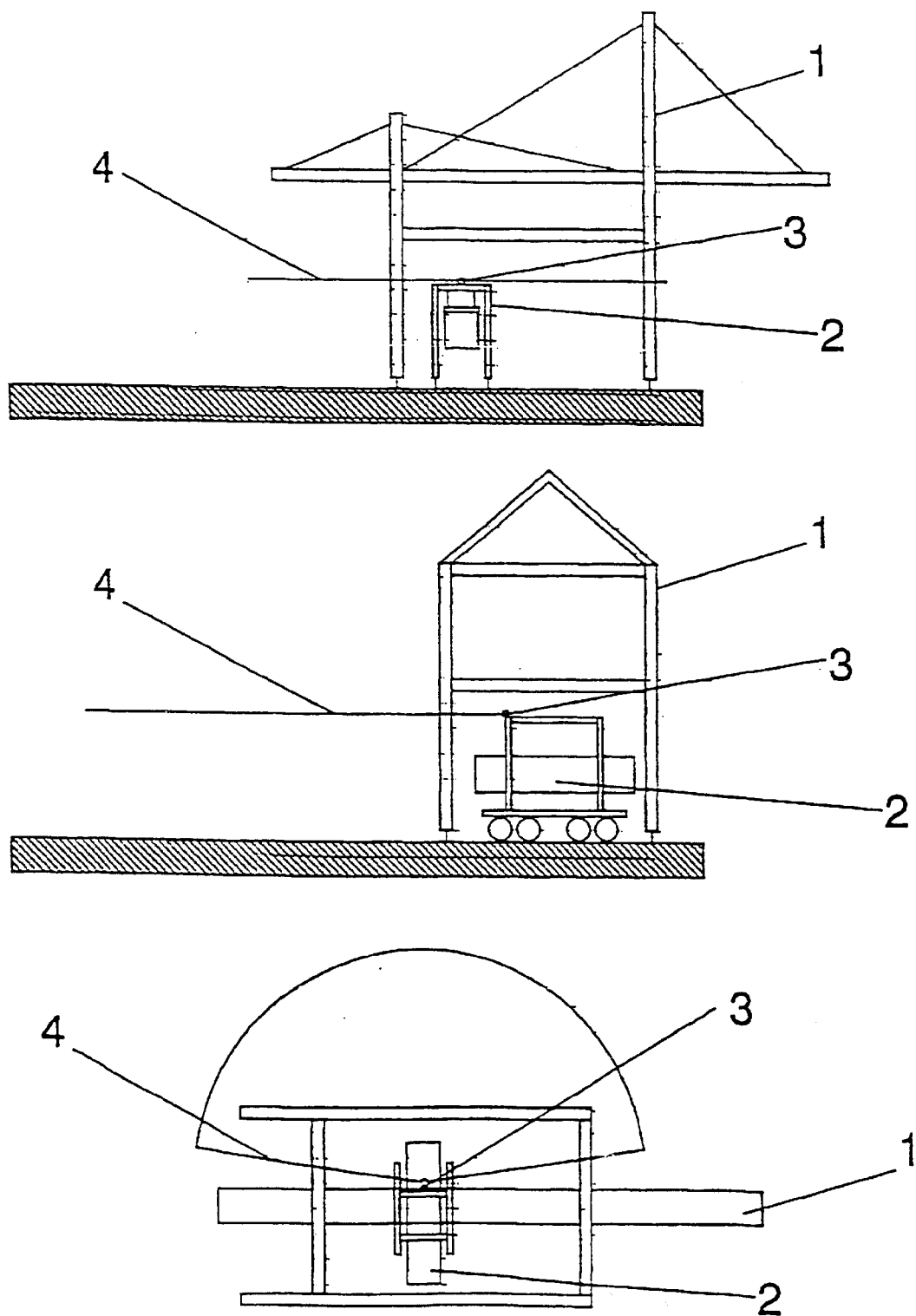
FIG. 2 is a schematic representation of three views of a container portal and a portal stacking truck with a laser scanner as the stacking truck is being positioned below the portal of the container.
Figure 3:
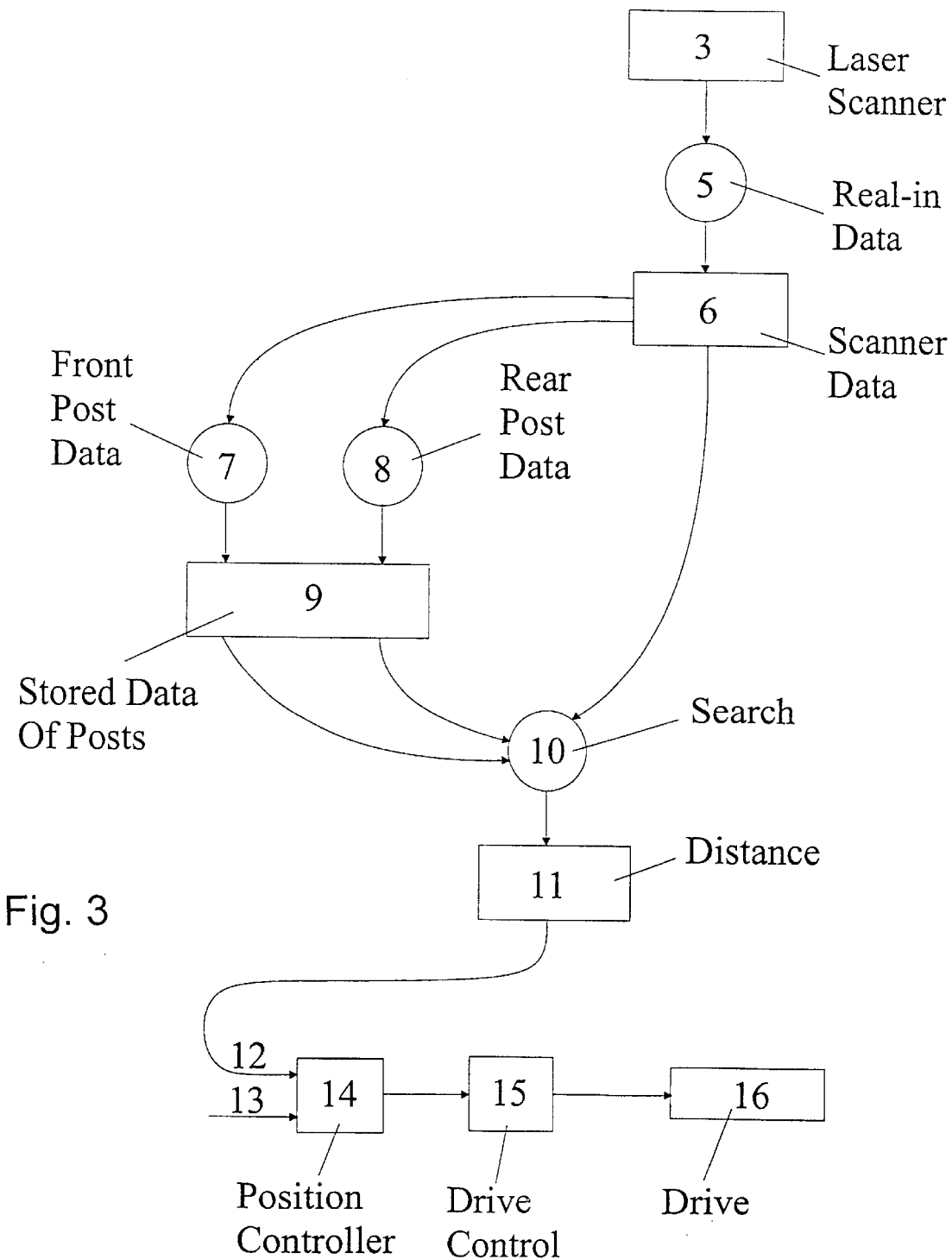
FIG. 3 is a schematic representation of the function of the evaluating computer.

FIG. 1 shows three views of a portal stacking truck 2, on which a laser scanner 3 is arranged. The posts of a container crane 1 are located in the field of search of the laser scanner as the portal stacking truck is standing in front of the container crane 1. The laser beam 4 detects two posts of the portal crane 1 located at the level of the top edge of the portal stacking truck 2. With the portal stacking truck 2 in the position shown in FIG. 2, the front posts of the portal crane 1 are detected first and the data are stored. In order to detect the rear posts of the portal crane 1, the portal stacking truck 2 drives into the position shown in FIG. 2. After the portal stacking truck has been driven into said two positions, in which it determines its own position vis-à-vis the posts of the container crane, the portal stacking truck is capable of continuously operating via the data received in the evaluating computer via the laser scanner with respect to the position of the posts of the container crane. FIG. 3 shows the schematic representation of the function of the evaluating computer. The laser scanner 3 reads in the five continuous data 6 that relate to the front post 7 and the rear post 8. Said data 9 are stored and the position (10) of the stacking truck is determined based on said data. Furthermore, the distance 11 of the stacking truck from the target position is determined. In this way, the actual position 12 obtained in this manner is continually compared with the preset should-be position 13. A positioning controller 14 continually compares in this manner the detected data with the preset data. The positioning controller 14 acts on the drive control 15 or the drive 16 until the data of the should-be position 13 correspond with the data of the actual position 12. The portal stacking truck 2 has then reached its target location and can deposit the container in the desired position.

What is claimed is:

1. A method for determination of a portal stacking truck (2) in relation to a container crane (1), in which a laser scanner (3), mounted on the portal stacking truck (2), serves for the position of the portal stacking truck (2), and an evaluating device are coupled to the laser scanner (3), comprising the steps of:

detecting posts of a container crane in terms of an angle and distance measurement value of at least one laser scanner (3), mounted on the portal stacking truck (2), as a crane reference position;

sending measurement values of the laser scanner (3) to an evaluating device, which compares the measurement values of the laser scanner (3) with already in program existing values for position and dimension of the posts of the container crane (1);

thus determining an exact position of the stacking truck (2) in relation to the posts of the container crane (1); and whereby based on said determining, the stacking truck (2) can be driven into an exactly predetermined actual position vis-á-vis the posts of the container crane (1).

2. The method according to claim 1, comprising the evaluating device picking up a contour of any desired container cranes.

* * * * *